US008751648B2

(12) United States Patent
Scherzer et al.

(10) Patent No.: US 8,751,648 B2
(45) Date of Patent: Jun. 10, 2014

(54) PROVIDING AND RECEIVING NETWORK ACCESS

(75) Inventors: Shimon Scherzer, Los Gatos, CA (US); Tamir Scherzer, Herzelia (IL)

(73) Assignee: Wefi, Inc., Marlborough, MA (US)

( * ) Notice: Subject to any disclaimer, the term of this patent is extended or adjusted under 35 U.S.C. 154(b) by 2014 days.

(21) Appl. No.: 11/441,827

(22) Filed: May 25, 2006

(65) Prior Publication Data

US 2007/0033197 A1    Feb. 8, 2007

Related U.S. Application Data

(60) Provisional application No. 60/687,463, filed on Jun. 3, 2005, provisional application No. 60/728,918, filed on Oct. 21, 2005, provisional application No. 60/772,084, filed on Feb. 9, 2006, provisional application No. 60/776,444, filed on Feb. 23, 2006.

(51) Int. Cl.
*G06F 15/173* (2006.01)
*G06F 15/177* (2006.01)
*G06F 15/16* (2006.01)

(52) U.S. Cl.
USPC ............................. 709/225; 709/220; 709/229

(58) Field of Classification Search
USPC ........................................................ 709/225
See application file for complete search history.

(56) References Cited

U.S. PATENT DOCUMENTS

| 6,498,786 | B1 * | 12/2002 | Kirkby et al. ................. 370/322 |
| 7,103,661 | B2 | 9/2006 | Klein |
| 7,266,595 | B1 | 9/2007 | Black et al. |
| 7,359,387 | B2 * | 4/2008 | Wang ............................. 370/400 |
| 7,483,984 | B1 | 1/2009 | Jonker et al. |
| 2002/0085719 | A1 * | 7/2002 | Crosbie ......................... 380/248 |
| 2002/0087573 | A1 * | 7/2002 | Reuning et al. ............... 707/102 |
| 2002/0120757 | A1 * | 8/2002 | Sutherland et al. ........... 709/229 |
| 2002/0124188 | A1 * | 9/2002 | Sherman et al. .............. 713/201 |
| 2002/0184310 | A1 * | 12/2002 | Traversat et al. ............. 709/204 |
| 2003/0005133 | A1 * | 1/2003 | Banerjee et al. .............. 709/229 |
| 2003/0028596 | A1 * | 2/2003 | Toyota et al. ................. 709/204 |
| 2004/0066759 | A1 | 4/2004 | Molteni et al. |
| 2004/0209622 | A1 * | 10/2004 | Kotzin ....................... 455/452.1 |
| 2005/0070279 | A1 | 3/2005 | Ginzburg et al. |
| 2005/0198388 | A1 * | 9/2005 | Teodosiu et al. ............. 709/245 |
| 2005/0223086 | A1 * | 10/2005 | Raverdy et al. .............. 709/220 |

(Continued)

OTHER PUBLICATIONS

Bahl et al. "MultiNet: Connecting to Multiple IEEE 802.11 Networks Using a Single Wireless Card." Technical Report MSR-TR-2003-46. Aug. 2003. Microsoft Research Microsoft Corporation. Redmond, WA.

*Primary Examiner* — Richard G Keehn
(74) *Attorney, Agent, or Firm* — Finnegan, Henderson, Farabow, Garrett & Dunner, LLP

(57) ABSTRACT

The disclosure concerns the expansion of wireless network access beyond networks for which a user is registered. A method of facilitating connection to a wireless network access point includes receiving a request from a user device for access information-required to connect to a network through an access point. The network being a network for which the user is not registered, determining user contribution account acceptability for the access point, and providing the access information to the user if the user contribution account is acceptable for said access point. In this manner, users who are willing to share network access to networks for which they are registered will be able to access networks for which they are not registered.

55 Claims, 6 Drawing Sheets

(56) References Cited

U.S. PATENT DOCUMENTS

| | | | |
|---|---|---|---|
| 2006/0031515 A1 * | 2/2006 | Van Gassel et al. | 709/227 |
| 2006/0089157 A1 * | 4/2006 | Casey et al. | 455/456.3 |
| 2006/0168438 A1 | 7/2006 | Klein | |
| 2007/0066304 A1 | 3/2007 | Lee | |
| 2008/0013487 A1 | 1/2008 | Molteni et al. | |

* cited by examiner

PROVIDING AND RECEIVING NETWORK ACCESS

CROSS REFERENCE TO OTHER APPLICATIONS

This application claims priority to U.S. Provisional Patent Application No. 60/687,463 entitled Collaborative Mobile Broad Band (CMBB) Service filed Jun. 3, 2005 which is incorporated herein by reference for all purposes.

This application claims priority to U.S. Provisional Patent Application No. 60/728,918 entitled Wireless Broadband by Centrally Managed Peer to Peer Networking filed Oct. 21, 2005 which is incorporated herein by reference for all purposes.

This application claims priority to U.S. Provisional Patent Application No. 60/772,084 entitled Client Based Wireless Network for Collaborative Community filed Feb. 9, 2006 which is incorporated herein by reference for all purposes.

This application claims priority to U.S. Provisional Patent Application No. 60/776,444 entitled Enhancing VoIP/WiFi Quality Using "Packet Path Diversity" & MultiNet filed Feb. 23, 2006 which is incorporated herein by reference for all purposes.

BACKGROUND OF THE INVENTION

Wireless connectivity can provide the ability to communicate between a user's device and the Internet enabling access to the information and services that the Internet makes available. Because of the utility of the information and services available on the Internet, it is desirable to be able to wirelessly connect to the Internet from any location. However, to provide wireless coverage for many locations, as, for example, cell phone networks do, requires a large infrastructure that is expensive. And as bandwidth requirements for wireless connectivity increase, the cost for the wireless connectivity rises. It would be beneficial to be able to connect wirelessly to the Internet from any location without the cost of building a large infrastructure.

BRIEF DESCRIPTION OF THE DRAWINGS

Various embodiments of the invention are disclosed in the following detailed description and the accompanying drawings.

DETAILED DESCRIPTION

Figure 1:
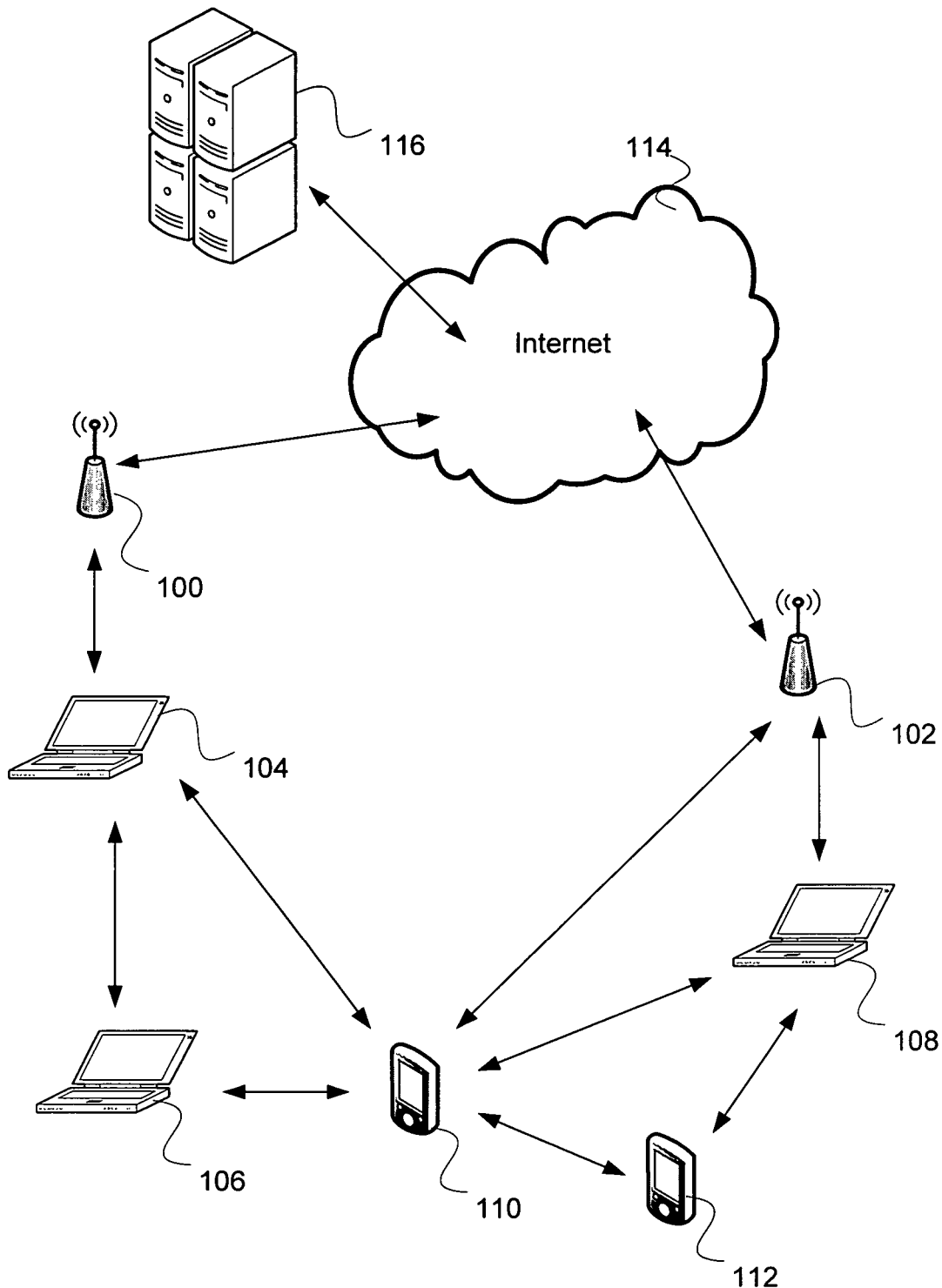
FIG. 1 is a block diagram illustrating an embodiment of a system for providing network access.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing network access is disclosed. A request is received for access information. User contribution account acceptability is determined. Access information is provided. In some embodiments, a collaborative community of users allows a percentage of bandwidth of the user's access point to be accessed by one or more other users in order to be able to use other access points when in locations not within range of the user's own access point. In some embodiments, some access or limited access is provided to use other users' access points without allowing use of an access point to other users. Access information comprises the information that can be used to access one or more of the following: the Internet, the world wide web, network services, wireless network services, broadband wireless network services, broadband wireless network services via Wi-Fi® access points, broadband wireless network services via a social network, and broadband wireless network services via a social network that is enabled by a community of collaborative users.

In some embodiments, a user contribution account is established when a user registers. In some embodiments, a temporary user contribution account is established—for example, for a trial period. When a user registers, the user provides registration information. In some cases registration information can be used to enable other users to access to the user's access point. In some embodiments, registration information is used to request access to the user's access point. In some embodiments, the user may choose to grant or deny access to his/her access point. In some embodiments, a user is provided with the ability to monitor and control access allowed to the user's access point—for example, viewing the users connected to the access point, viewing the to and from traffic usage of the access point, controlling or permitting the traffic levels to and from the access point, terminating or denying access through the access point, etc. In various embodiments, user allows access to other users by designated acceptable groups that are allowed access, by indicating that an immediate "friend" on a list is allowed, by indicating that a "friend of a friend" on a list of a friend is allowed, or any other appropriate way of designating one or more users can use the user's access point. Registration information can include one or more of the following: the user's access point information to enable a second user to use the user's access point, the user's identifier information (e.g., media access control (MAC) address), the user's access point service set identifier (SSID), the user's access point wired equivalent privacy (WEP) key or password, and the user's access point Wi-Fi protected access (WPA) key or password.

In some embodiments, user contribution accounting tracks the balance of bandwidth provided by a user via the user's access point to other users and the bandwidth used by the user via other's access points. In some embodiments, user contribution account balance is added to when bandwidth is used by a second user when accessing the user's access point and/or user contribution account balance is subtracted from when bandwidth is used by the user when accessing a third user's access point. In various embodiments, additions to a user's user contribution account balance are weighted proportional to a user's access point bandwidth allocation to other users or additions to a user's user contribution account balance are weighted proportional to a user's access point bandwidth used by a second, or other, users.

In various embodiments, user contribution account acceptability comprises having agreed to a trial period and being associated with a temporary user contribution account, having registered and being associated with a temporary user contribution account, having a temporary user contribution account, having a user contribution account, having a user contribution account balance, having a user contribution account balance above a threshold value, having a user contribution account balance below a threshold value, having a user contribution account balance in a range a values, or any other appropriate criteria for acceptability.

In some embodiments, connection status information is provided and/or received. Connection status information can be used to select appropriate access point. Status information can include one or more of the following: visible network access points at a given location, number of users using each of the visible access points, signal strength for the visible network access points, average transfer rates to or from the visible network access points, bandwidth allocation for the visible network access points, retry statistics for visible network access points, the user's access point bandwidth allocation for other users, and mean and/or variance of the return ping delays (e.g., the time it takes for a return message from the provider's server or any other computer dedicated to this function, to arrive after a message was sent to it from the user device or from an access point) for visible network access points. In some embodiments, the appropriate access point comprises an access point that has better performance (e.g., higher bandwidth from the network, shorter response delays, lower variance of signal strength/bandwidth, etc.). In various embodiments, user determines one or more types of connection status information, user transmits one or more types of connection status information to a provider server or other users, and/or user receives one or more types of connection stats information from a provider server or other users.

FIG. 1 is a block diagram illustrating an embodiment of a system for providing network access. In the example shown, wireless access points, represented in FIG. 1 by 100 and 102, enable access to Internet 114. In various embodiments, access to Internet 114 is via an internet service provider (e.g., a local phone carrier using a dial-up modem or digital subscriber line (DSL), a cable provider using a cable modem, a satellite company using a modem that can communicate via a satellite, etc.), via a local area network, a wide area network, a wired network, a wireless network, an optical network, or any other appropriate network enabling communication with Internet 114. A user, represented in FIG. 1 as laptop device 104, 106, and 108, or personal digital assistant (PDA) 110 and 112, allows access to the user's access point in exchange for being allowed to access other user's access points. In some embodiments, a user is allowed minimal or limited access without allowing other user's to access the user's access point. This can enable a user to be able to access the Internet, its services and information, from a large number of locations. A user registers with the provider of network access by communicating with provider application server 116. Application server 116 receives and stores registration information. Registration information enables another user to request access to or access the user's access point. Application server 116 provides the user with a software client. In some embodiments, the user is provided a software client without being connected directly or indirectly to application server 116 (e.g., the software is sent via the mail on a piece of storage media or the software is downloaded from a third party web site). The software client enables the user to access another user's access point either directly or by relaying information through another registered user's device. Access point information (e.g., SSID's, WEP/WPA keys or passwords, etc.) can be provided to a user via a wired network by preloading the user's device, a cell phone network, a Wi-Fi network, or any other appropriate network. In some embodiments, access information is provided to a user not in real time—for example, the user down loads access information form server while connected to his own access point before going to a new location where user desires to user other user's access points.

Figure 2:
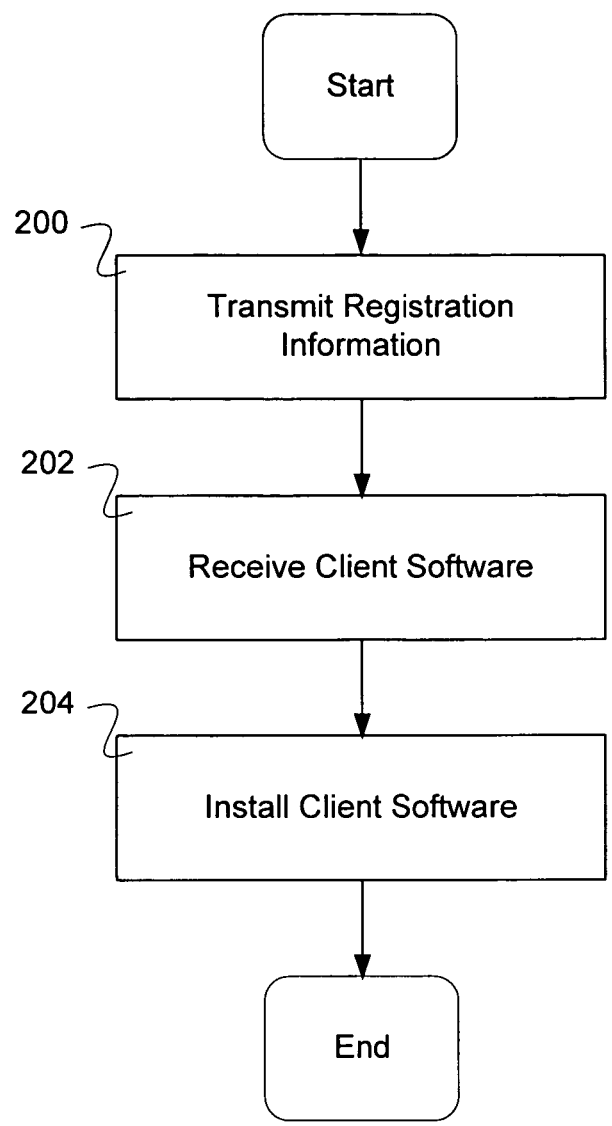
FIG. 2 is a flow diagram illustrating an embodiment of a process for providing network access.

FIG. 2 is a flow diagram illustrating an embodiment of a process for providing network access. In some embodiments, the process of FIG. 2 is caused to be executed by user on a user's device—for example, users represented in FIG. 1 by 104, 106, 108, 110, or 112. In the example shown, in 200 registration information is transmitted. Registration information can include one or more of the following: the user's access point information to enable a second user to use the user's access point, the user's identifier information (e.g., media access control (MAC) address), the user's access point service set identifier (SSID), the user's access point wired equivalent privacy (WEP) key or password, the user's access point Wi-Fi protected access (WPA) key or password, and the user's access point bandwidth allocation for a second user. The registration information is used by the provider of the network to set up a user contribution account and to enable other registered users of the network to access the user's access point. In 202, client software is received. The client software is provided by the provider to enable the user's device to be able to contact the provider application server and to acquire access information for network access points that are made available by a given user to other network users. In 204, client software is installed. In various embodiments, client software is installed before registration or client software is installed after registration. In some embodiments, the client software enables the user to contact the provider's application server in order to obtain access information for a location where the user is not able to use the user's own access point. Access information enables the user to use another user's access point in order to gain access to the Internet.

Figure 3:
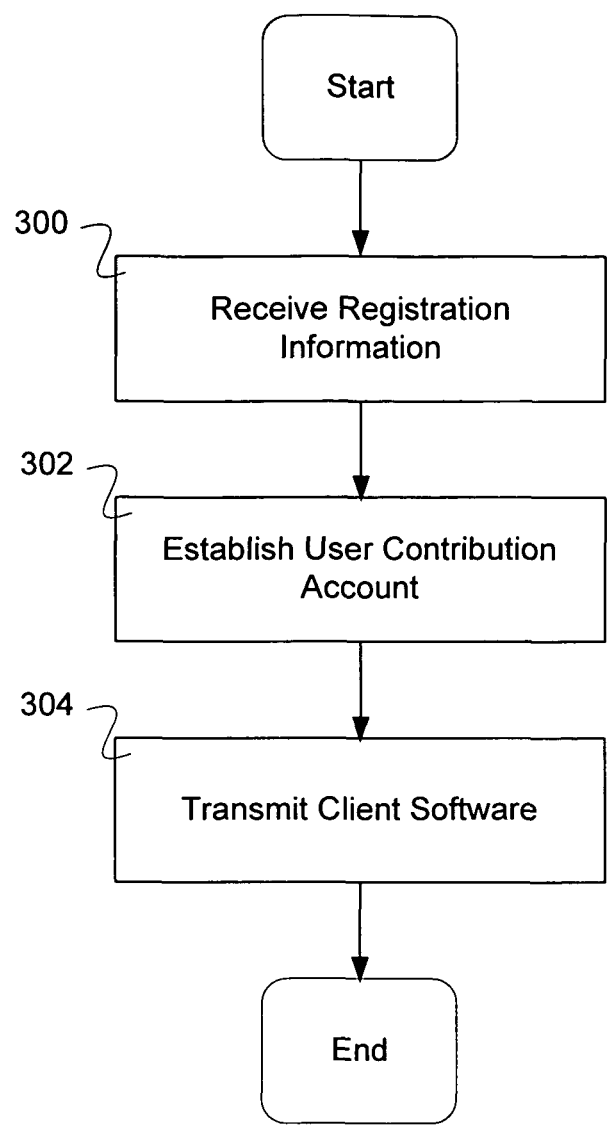
FIG. 3 is a flow diagram illustrating an embodiment of a process for providing network access.

FIG. 3 is a flow diagram illustrating an embodiment of a process for providing network access. In some embodiments, the process of FIG. 3 is caused to be executed by provider application server 116 of FIG. 1. In the example shown, in 300 registration information is received. In some embodiments, registration information is received via a web application—for example, a user's browser communicating with the provider's web site or a web applet communicating via the Internet. Registration information can include one or more of the following: the user's access point information to enable a second user to use the user's access point, the user's identifier information (e.g., media access control (MAC) address), the user's access point service set identifier (SSID), the user's access point wired equivalent privacy (WEP) key or password, the user's access point Wi-Fi protected access (WPA) key or password, and the user's access point bandwidth allocation for other users. The registration information is used by the provider of the network to set up a user contribution account and, if appropriate, to enable other registered users of the network to access the user's access point. In 302, user contribution account is established. The user contribution account comprises a way to track the amount of access that is given by a user to other users of the network. Similarly, the user contribution account comprises a way to track the amount of access that is used by a user of other users' access points. In some embodiments, user contribution accounting tracks the balance of bandwidth provided by a user via the user's access point to other users and the bandwidth used by the user via other's access points. In some embodiments, user contribution account balance is added to when bandwidth is used by a other users when accessing the user's access point and/or user contribution account balance is subtracted from when bandwidth is used by the user when accessing another user's access point. In some embodiments, the user accesses a plurality of access points because an access point becomes unavailable—for example, the user has changed locations (e.g., roaming) or the access point that the user was connected to is no longer available or is no longer desirable (e.g., over loaded). In various embodiments, user contirbution account acceptability comprises having a user contribution account, having a user contribution account balance, having a user contribution account balance above a threshold value, having a user contribution account balance below a threshold value, having a user contribution account balance in a range a values. In various embodiments, additions to a user contribution account balance are weighted in proportion to a user's access point bandwidth allocation to other users or a user's access bandwidth used by another user. In some embodiments, the registration information is accepted after being received. In some embodiments, determining user contribution account acceptability includes checking user contribution account registration information for a user. In 304, client software is transmitted. The client software, once installed in the client device, enables the user to contact the provider's application server in order to obtain access information for a location where the user is not able to use the user's own access point. Access information enables the user to use another user's access point in order to gain access to the Internet.

Figure 4:
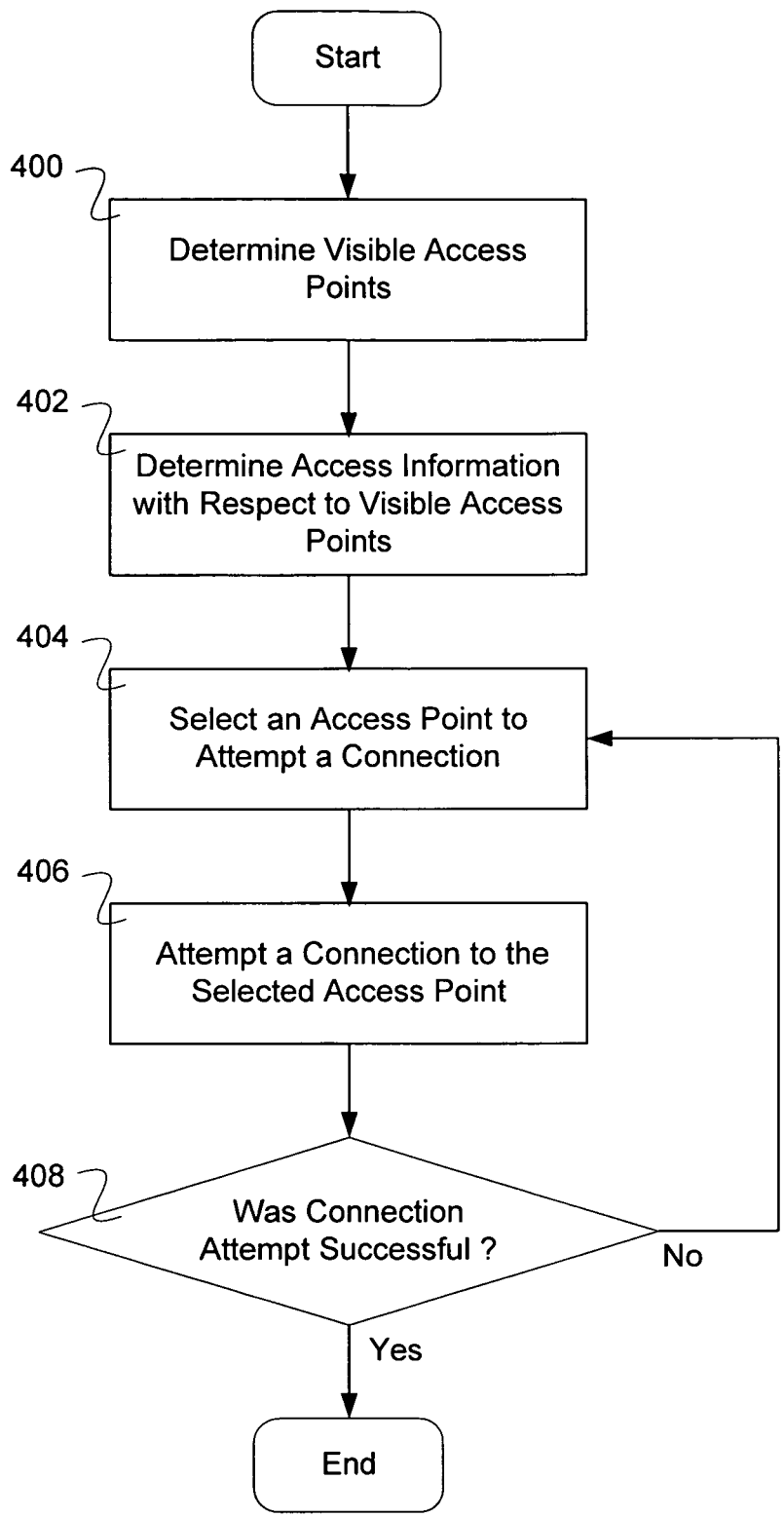
FIG. 4 is a flow diagram illustrating an embodiment of a process for providing network access.

FIG. 4 is a flow diagram illustrating an embodiment of a process for providing network access. In some embodiments, the process of FIG. 4 is caused to be executed by user on a user's device—for example, users represented in FIG. 1 by 104, 106, 108, 110, or 112. In some embodiments, the process of FIG. 4 is executed as a part of client software that is provided by the network provider. In the example shown, in 400 visible access points are determined. The user's device identifies the visible wireless access points. In 402, access information with respect to the visible access points is determined. Access information can be determined by looking access information up in a preloaded table or file located on the user's device, or downloaded or accessed via a cellular connection, a text messaging system, a Wi-Fi network, an open wireless access system, a wired or phone system, or any other appropriate manner of obtaining access information. In 404, an access point is selected with which to attempt a connection. Access point selection is based on the most appropriate access point for a user's device, where most appropriate comprises appropriate performance (e.g., most reliable, highest average bandwidth, lowest variance in signal strength, highest average signal strength, shortest response delays, best average transfer rates, most bandwidth allocated for outside users, fewest retries, and lowest return ping delays, etc.). In 406, a connection is attempted to the selected access point. In some embodiments, the connection is attempted to more than one access point simultaneously, where the multiple connections are used concurrently to increase performance—for example, reliability and/or throughput. Access information is used to attempt a connection to the access point and communication via the access point is attempted to the Internet. In 408, it is determined if the connection attempt was successful. In the event that the attempt was not successful, control is passed to 404. In the event that the attempt was successful, the process ends.

Figure 5:
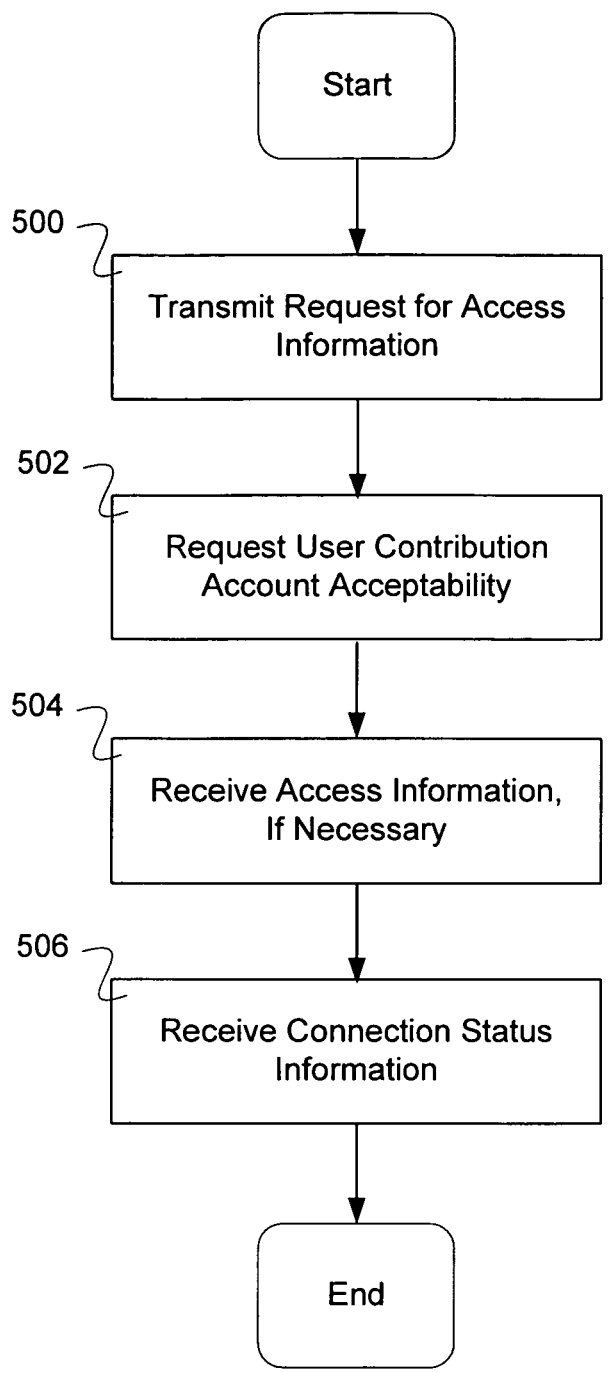
FIG. 5 is a flow diagram illustrating an embodiment of a process for determining access information.

FIG. 5 is a flow diagram illustrating an embodiment of a process for determining access information. In some embodiments, the process of FIG. 5 implements 402 in FIG. 4. In some embodiments, the process of FIG. 4 is executed as a part of client software that is provided by the network provider (e.g., downloaded directly from the provider, from a third party, or as received on a removable piece of storage media such as a CD or DVD). In the example shown, in 500 a request is transmitted for access information. Access information is requested regarding one or more access points. In some embodiments, access information is requested before arriving at a given location—preloading access information for a given location. In 502, user contribution account acceptability is requested. In some embodiments, user contribution account acceptability request comprises a request for access information. In 504, access information is received, if necessary. Access information can include SSID's, WEP or WPA passwords or keys or any other appropriate information for accessing access points. In some embodiments, access information is received before arriving at a given location (e.g., preloading access information for a given location). In some embodiments, a default set of network access information is preloaded. In some embodiments, one or more elements of the access information are calculated from other access information—for example, a password or key is calculated from an SSID, MAC address, user name, etc. In 506, connection status information is received. Connection status information can include access point type, backhaul band width (e.g., actual bandwidth available to the local access point from the Internet), number of users using visible access points, traffic each user consumes and/or generates, network congestion, usage priority, average signal strength and variance of signal strengths to and from the access point, average and variance statistics for ping delays, response times, retry statistics, etc. Connection status information can be used to determine the most appropriate access point to choose when attempting to communicate with the network. In some embodiments, each user may report his/her connection experience with a specific access point (e.g., connection status information such as average and/or variance of data rate, retry statistics, connection failures, etc.) and the connection status information becomes a part of the connection status information available to all users connecting the access point. In some embodiments, access is caused to be granted to the user. In some embodiments, access is caused to be granted by providing access information to a user.

Figure 6:
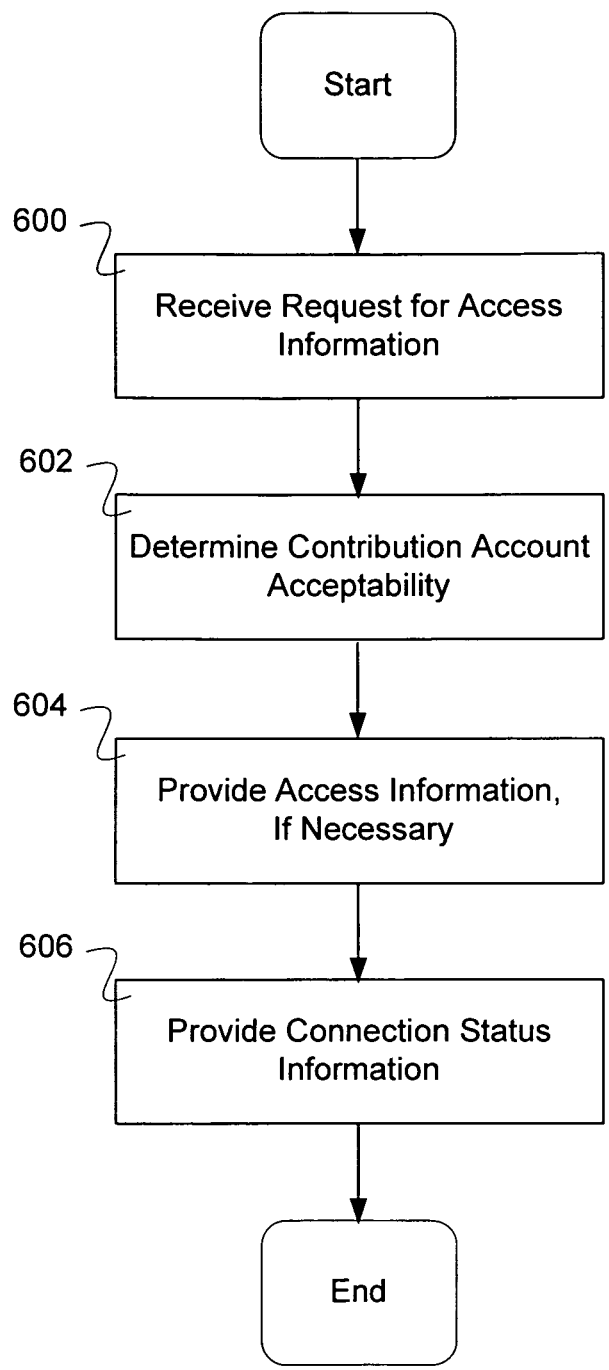
FIG. 6 is a flow diagram illustrating an embodiment of a process for providing access information.

FIG. 6 is a flow diagram illustrating an embodiment of a process for providing access information. In some embodiments, the process of FIG. 6 is executed on application server 116 of FIG. 1. In the example shown, in 600 a request is received for access information. Access information is requested regarding one or more access points. In some embodiments, access information is requested before arriving at a given location—preloading access information for a given location. In 602, user contribution account acceptability is determined. In various embodiments, user contribution account acceptability comprises having a user contribution account (temporary account or permanate account), having a user contribution account balance, having a user contribution account balance above a threshold value, having a user contribution account balance below a threshold value, having a user contribution account balance in a range a values, and/or any other appropriate acceptability criteria. In various embodiments, additions to a user contribution account balance are weighted proportion to a user's access point bandwidth allocation to other users or a user's access bandwidth used by another user. In some embodiments, the registration information is accepted after being received. In some embodiments, determining user contribution account acceptability includes checking user contribution account registration information for a user. In 604, access information is provided, if necessary. Access information can include SSID's, WEP or WPA passwords or keys or any other appropriate information for accessing access points. In some embodiments, access information is received before arriving at a given location (e.g., preloading access information for a given location). In some embodiments, a default set of network access information is preloaded. In 606, connection status information is provided. Connection status information can include access point type, backhaul band width (e.g., actual bandwidth available to the local access point from the Internet), number of users using visible access points, average signal strength and variance of signal strengths to and from the access point, ping delay statistics, response times, retry statistics, the user's access point bandwidth allocation for other users, etc. Connection status information can be used to determine the most appropriate access point to choose when attempting to communicate with the network. In some embodiments, connection status information is received from a plurality of users or clients, aggregated for a given access point, and provided to a user so that the user can best determine which access point to connect to.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of facilitating connection to a wireless network access point comprising:
    storing, by a server, access point information for one or more wireless network access points, each of which enables a user device to connect to a network;
    receiving, by the server, a request from a user device for the access point information;
    determining, at the server, user contribution account acceptability for a user associated with the user device, based, at least in part, on an amount of bandwidth provided by a wireless network access point associated with the user to one or more other user devices to connect to the network, wherein one or more other users of the one or more other user devices are associated with the one or more wireless network access points;
    wherein determining user contribution account acceptability includes verifying an acceptable user contribution account balance;
    wherein additions to a user contribution account balance are weighted proportional to access point bandwidth allocation provided by the user to other users; and
    providing the access point information to the user device based at least in part on the determination.

2. A method as in claim 1, wherein the request for access point information is requested using one or more of the following:
    a software client and a web application.

3. A method as in claim 2, wherein the software client enables one or more of the following:
    monitoring use of an access point, controling access to an access point, permitting use of an access point, viewing other users connected to an access point, viewing levels of traffic to or from an access point, and denying use of an access point.

4. A method as in claim 1, further comprising connecting the user device to an access point using the access point information.

5. A method as in claim 1, wherein access point information can be used to access one or more of the following through the-an access point:
    the Internet, the world wide web, network services, wireless network services, broadband wireless network services, broadband wireless network services via WiFi access points, broadband wireless network services via a social network, and broadband wireless network services via a social network that is enabled by a community of collaborative users.

6. A method as in claim 1, wherein a first element of access point information is calculated from a second element of access point information.

7. A method as in claim 1, further comprising receiving user registration information.

8. A method as in claim 7, wherein registration information includes one or more of the following: the user's access point information to enable a second user to use the user's access point, the user's identifier information, the user's access point SSID, the user's access point WEP key, the user's access point WPA key, and the user's access point bandwidth allocation for a second user.

9. A method as in claim 1, further comprising accepting user registration information.

10. A method as in claim 1, wherein determining user contribution account acceptability includes checking user contribution account registration information for a user.

11. A method as in claim 1, wherein determining user contribution account acceptability comprises determining one or more of the following:
    whether the user has agreed to a trial period and being associated with a temporary user contribution account, whether the user has registered and being associated with a temporary user contribution account, whether the user has a temporary user contribution account, whether the user has a user contribution account, whether the user has a user contribution account balance, whether the user has a user contribution account balance above a threshold value, whether the user has a user contribution account balance below a threshold value, and whether the user has a user contribution account balance in a range a value.

12. A method as in claim 1, wherein user contribution account balance is added to when bandwidth is used by a second user when: accessing an access point associated with the user.

13. A method as in claim 1, wherein user contribution account balance is subtracted from when bandwidth is used by the user when accessing a third user's access point.

14. A method as in claim 1, wherein additions to a user contribution account balance are weighted proportional to access point bandwidth used by a second user.

15. A method as in claim 1, wherein the access point information is provided using one or more of the following: a cellular network, a WiFi network, and a wireless access point.

16. A method as in claim 1, further comprising receiving connection status information that can be used to select an appropriate access point for a user device.

17. A method as in claim 16, wherein the status information includes one or more of the following: visible network access points, signal strength for visible network access points, number of users using a visible access points, average transfer rates to or from the visible network access points, bandwidth allocation to a visiting user for visible network access points, retry statistics for visible network access points, the user's access point bandwidth allocation for other users, and statistics of return ping delays for visible network access points.

18. A method as in claim 1, further comprising providing connection status information that can be used to select an appropriate access point by a user device.

19. A method as in claim 18, wherein the status information includes one or more of the following: visible network access points, signal strength for visible network access points, average transfer rates to or from the visible network access points, bandwidth allocation for visible network access points, retry statistics for visible network access points, the user's access point bandwidth allocation for other users, and statistics of return ping delays for visible network access points.

20. A method as in claim 1, wherein said user contribution account indicates at least one of the amount of access that is given by the user to other users of a network for which the user is registered and the amount of access that is given to the user to networks of other users.

21. A system for facilitating connection to a wireless network access point comprising:
a processor; and
a memory coupled with the processor, wherein the memory is configured to provide the processor with instructions which when executed cause the processor to:
receive a request from a user device for access point information of one or more wireless network access points, each of which enables the user device to connect to a network;
determine user contribution account acceptability for a user associated with the user device, based, at least in part, on an amount of bandwidth provided by a wireless network access point associated with the user to one or more other user devices to connect to the network, wherein one or more other users of the one or more other user devices are associated with the one or more wireless network access points;
wherein determining user contribution account acceptability includes verifying an acceptable user contribution account balance;
wherein additions to a user contribution account balance are weighted proportional to access point bandwidth allocation provided by the user to other users; and
providing the access point information to the user device based, at least in part, on the determination.

22. The system as in claim 21, wherein access point information can be used to access one or more of the following through the access point: the Internet, network services, wireless network services, broadband wireless network services, broadband wireless network services via WiFi Access points, broadband wireless network services via a social network, and broadband wireless network services via a social network that is enabled by a community of collaborative users.

23. The system as in claim 21, further comprising transmitting user registration information.

24. The system as in claim 21, wherein registration information includes one or more of the following: the user's access point information to enable a second user to use the user's access point, the user's identifier information, the user's access, point SSID, the user's access point WEP key, the user's access point WPA key, and the user's access point bandwidth allocation for a second user.

25. The system as in claim 21, where a first element of access point information is calculated from a second element of access point information.

26. The system as in claim 21, further comprising requesting acceptance of user registration information.

27. The system as in claim 21, wherein determining user contribution acceptability includes checking user contribution account registration information for a user.

28. The system as in claim 21, wherein user contribution account acceptability comprises one or more of the following: having agreed to a trial period and being associated with a temporary user contribution account, having registered and being associated with a temporary user contribution account, having a temporary user contribution account, having a user contribution account, having a user contribution account balance, having a user contribution account balance above a threshold value, having a user contribution account balance below a threshold value, and having a user contribution account balance in a range a values.

29. The system as in claim 21, wherein user contribution account balance is added to when bandwidth is used by a second user when accessing an access point associated with the user.

30. The system as in claim 29, wherein user contribution account balance is subtracted from when bandwidth is used by the user when accessing a third user's access point.

31. The system as in claim 29, wherein additions to a user contribution account balance are weighted proportional to a user's access point bandwidth used by a second user.

32. The system as in claim 21, wherein the access point information is provided using one or more of the following: a cellular network, a WiFi network, and a wireless access point.

33. The system as in claim 21, further comprising transmitting connection status information that can be used to select appropriate access point by a user device.

34. The system as in claim 33, wherein the status information includes one or more of the following: visible network access points, signal strength for visible network access points, number of users using a visible access points, average transfer rates to or from the visible network access points, bandwidth allocation to a visiting user for visible network access points, retry statistics for visible network access points, and statistics of return ping delays for visible network access point.

35. The system as in claim 21, further comprising receiving connection status information that can be used to select appropriate access point for a user device.

36. The system as in claim 35, wherein the status, information includes one or more of the following: visible network access points, signal strength for visible network access points, average transfer rates to or from the visible network access points, bandwidth allocation for visible network access points, retry statistics for visible network access points, and statistics of return ping delays for visible network access points.

37. A system as in claim 21, wherein said user contribution account indicates at least one of the amount of access that is given by the user to other users of a network for which the user is registered and the amount of access that is given to the user to networks of other users.

38. A computer program product for facilitating connection to a wireless network access point and computer program product being embodied in a non-transitory computer readable medium and comprising computer instructions for causing a computer processor to execute the following:
receiving a request from a user device for access point information of one or more wireless network access points, each of which enables the user device to connect to a network;
determining user contribution account acceptability for a: user associated with the user device, based, at least in part, on an amount of bandwidth provided by a wireless network access point associated with the user to one or more other user devices to connect to the network, wherein one or more other users of the one or more other user devices are associated with the one or more wireless network access points;
wherein determining user contribution account acceptability includes verifying an acceptable user contribution account balance;
wherein additions to a user contribution account balance are weighted proportional to access point bandwidth allocation provided by the user to other users; and
providing the access point information to the user device based, at least in part, on the determination.

39. The computer program product as in claim 38, further comprising connecting the user device to the access point using the access information.

40. The computer program product as in claim 38, wherein access point information can be used to access one or more: of the following through the wireless network access point: the Internet, network services, wireless network services, broadband wireless network services, broadband wireless network services via WiFi Access points, broadband wireless network services via a social network, and broadband wireless network services via a social network that is enabled by a community of collaborative users.

41. The computer program product as in claim 38, further comprising transmitting user registration information.

42. The computer program product as in claim 38, wherein registration information includes one or more of the following: the user's access point information to enable a second user to use the user's access point, the user's identifier information, the user's access point SSID, the user's access point WEP key, the user's access point WPA key, and the user's access point bandwidth allocation for a second user.

43. The computer program product as in claim 38, wherein a first element of access information is calculated from a second element of access information.

44. The computer program product as in claim 38, further comprising requesting acceptance of user registration information.

45. The computer program product as in claim 38, wherein determining user contribution account acceptability includes checking user contribution account registration information for a user.

46. The computer program product as in claim 38, wherein user contribution account acceptability comprises one or more of the following: having agreed to a trial period and being associated with a temporary user contribution account, having registered and being associated with a temporary user contribution account, having a temporary user contribution account, having a user contribution account, having a user contribution account balance: having a user contribution account balance above a threshold value, having a user contribution account balance below a threshold value, and having a user contribution account balance in a range a values.

47. The computer program product as in claim 38, wherein user contribution account balance is added to when bandwidth is used by a second user when accessing an access point associated with the user.

48. The computer program product as in claim 38, wherein user contribution account balance is subtracted from when bandwidth is used by the user when accessing a third user's access point.

49. The computer program product as in claim 38, wherein additions to a user contribution account balance are weighted proportional to access point bandwidth used by a second user.

50. The computer program product as in claim 38, wherein the access point information is provided using one or more of the following: a cellular network, a WiFi network, and a wireless access point.

51. The computer program product as in claim 38, further comprising transmitting connection status information that can be used to select an appropriate access point by a user device.

52. The computer program product as in claim 51, wherein the status information includes one or more of the following: visible network access points, signal strength for visible network access points, number of users using a visible access points, average transfer rates to or from the visible network access points, bandwidth allocation to: a visiting user for visible network access points, retry statistics for visible network access points, and statistics of return ping delays for visible network access points.

53. The computer program product as in claim 38, further comprising receiving connection status information that can be used to select an appropriate access point for a user.

54. The computer program product as in claim 53, wherein the status information includes one or more of the following: visible network access points, signal strength for visible network access points, average transfer rates to or from the visible network access points, bandwidth allocation for visible network access points, retry statistics for visible network access points, and statistics of return ping delays for visible network access points.

55. The computer program product as in claim 38, wherein said user contribution account indicates at least one of the amount of access that is given by the user to other users of a network for which the user is registered and the amount of access that: is given to the user to networks of other users.

\* \* \* \* \*

UNITED STATES PATENT AND TRADEMARK OFFICE
CERTIFICATE OF CORRECTION

PATENT NO. : 8,751,648 B2  
APPLICATION NO. : 11/441827  
DATED : June 10, 2014  
INVENTOR(S) : Scherzer et al.

Page 1 of 1

It is certified that error appears in the above-identified patent and that said Letters Patent is hereby corrected as shown below:

On the Title page, item [57] line 5, "information-required" should read -- information required --.

In the Claims

Claim 11, col. 8, line 60, "account balance in a range a value" should read -- account balance in a range of values --.

Claim 17, col. 9, line 14, "users using a visible access points" should read -- users using visible access points --.

Claim 28, col. 10, line 31, "account balance in a range a values" should read -- account balance in a range of values --.

Claim 34, col. 10, line 51, "users using a visible access points" should read -- users using visible access points --.

Claim 34, col. 10, lines 55-56, "for visible network access point" should read -- for visible network access points --.

Claim 46, col. 12, line 14, "account balance in a range a values" should read -- account balance in a range of values --.

Claim 52, col. 12, lines 36-37, "users using a visible access points" should read -- users using visible access points --.

Claim 55, col. 12, line 57, "access that: is given." should read -- access that is given --.

Signed and Sealed this  
Twenty-first Day of October, 2014

Michelle K. Lee  
*Deputy Director of the United States Patent and Trademark Office*